Patented July 8, 1947

2,423,530

UNITED STATES PATENT OFFICE 2,423,530

ALKYLATION OF ARYL HYDROCARBONS

Carlisle M. Thacker, Highland Park, and Ralph C. Swann, Skokie, Ill., assignors to The Pure Oil Company, Chicago, Ill., a corporation of Ohio No Drawing. Application December 13, 1943, Serial No. 514,161

16 Claims. (Cl. 260—671)

This invention relates to the synthesis of alkylated aromatic hydrocarbons and more particularly to the synthesis of alkyl benzenes from alkyl mercaptans or sulfides and benzene or other aromatic hydrocarbons.

We have discovered that aromatic hydrocarbons react with alkyl mercaptans and alkyl sulfides in the presence of a Friedel-Crafts catalyst, such as anhydrous aluminum chloride or ferric chloride to form alkylated aromatic hydrocarbons and hydrogen sulfide. Reaction takes place at temperatures ranging from approximately 50° C. to approximately 400° C., but preferably in the range of 100 to 200° C. At lower temperatures longer contact times are necessary than are required at higher temperatures. Reaction takes place at atmospheric or at super-atmospheric pressure. In order to prevent formation of polyalkyl aromatics, it is desirable to maintain a molal excess of benzene or other aromatic hydrocarbons to alkyl mercaptans or sulfides in the reaction. The higher the mole ratio of benzene to alkyl mercaptan or sulfide, the higher the yield of the mono-alkyl benzene based on the alkyl mercaptan or sulfide charged to the reaction. Ratios of benzene to alkyl mercaptans from 2 to 1 to a ratio of 14 to 1 and ratios of benzene to alkyl sulfides from 4 to 1 to a ratio of 28 to 1 give satisfactory results in the preparation of mono-alkyl benzenes. The metal halide catalyst should be present in the reaction mixture in amounts of not less than 0.1 mole per mole of mercaptan and may be present in amounts up to 2 moles or more per mole of mercaptan.

The metal halides used to catalyze the reaction are commercial anhydrous halides. No special precautions are observed in handling to prevent absorption of traces of moisture from the air.

Contact time between the reactants and catalyst may vary from a few minutes to twenty hours or more. Good yields may be obtained at a reaction time of thirty minutes to six hours.

The process may be batch, semi-continuous or continuous. In batch operation, the desired quantities of reactants and catalyst may be placed in a closed reaction vessel, preferably provided with a mixing device. The reaction mixture is maintained at the desired temperature for the required period of time, after which the contents are taken from the reaction vessel, the metal halide complex decomposed by acid hydrolysis and the resulting products fractionated to recover alkyl benzene or other alkylated aromatic hydrocarbons, as well as unreacted aromatic hydrocarbons and mercaptan or sulfide.

Yields of alkyl benzene up to approximately 85% of theoretical may be obtained in accordance with our invention using reaction periods of moderate duration in a batch operation.

In semi-continuous operation, benzene or other aromatic hydrocarbon and alkyl mercaptan or sulfide may be intermittently charged to the reaction vessel, with corresponding alternate separation of products, for a given initial charge of catalyst until the catalyst phase is substantially exhausted. Since the catalyst phase containing the catalyst and its various complexes with the reactants is of greater density and higher boiling point than the reactants and desired products, the upper layer, or product phase, may be separated from the catalyst phase by mechanical means without disturbing the lower catalytic complex phase, or by stripping off the upper product phase by distillation leaving the lower catalyst phase to be used for catalyzing the reaction of another charge of reactants.

In continuous operation a series of reactors may be provided in which metal halide or metal halide complex is contacted serially with a stream of benzene and alkyl mercaptan, the reactants passing serially through the reaction vessels containing catalyst of gradually increasing activity. The aluminum chloride and ferric chloride form complexes with the reactants which may be used as catalytic material until the activity thereof is exhausted.

In order to demonstrate our invention, a series of runs was made using aluminum chloride and ferric chloride in the synthesis of ethyl benzene from benzene and ethyl mercaptan. Data in connection with the runs are set forth in the following table.

The temperatures given in the table represent the average of temperatures which were maintained during the reaction period given under the heading "Time at stated temperature." The figures given under "Total contact time" include the entire time that the reactants were in the reaction vessel. The figures given under the heading "Contact time during cooling" represent the period elapsed from the time heating of the reaction vessel was discontinued until it was opened.

The maximum and residual pressures given in the table represent the highest pressure obtained during the reaction and the pressure in the reaction vessel at the time it was opened. In runs 21—23 an initial pressure was imposed on the reaction mixture by means of nitrogen gas.

The yields of ethyl benzene are based on the theoretical yield possible from the quantity of ethyl mercaptans charged to the reaction vessel. Ethyl benzene in the reaction mixture was determined by carefully fractionating the reaction products in the laboratory and using a combination of boiling points and refractive indexes to determine the content of ethyl benzene in the mixture.

prepared in the same manner as the ethyl benzene by substituting the corresponding mercaptan for ethyl mercaptan. As previously pointed out, temperatures in the range of 100° C. to 200° C. are preferable where mono-alkyl benzene is desired. Higher temperatures tend toward the formation of poly-alkylated benzenes and poly-alkylated benzenes also tend to form with higher

| Run No. | Catalyst | Moles of Catalyst | Moles of $C_6H_6$ | Moles of $C_2H_5SH$ | Contact Time in Hours | | | Pressure in Lbs. per Sq. In. | | | Temp., °C. | Yield of Ethyl-benzene—Percent of theoretical |
|---|---|---|---|---|---|---|---|---|---|---|---|---|
| | | | | | Total | At Stated Temp. | During Cooling | Max. | End | Initial | | |
| 24 | AlCl₃ | 1 | 3 | 0.5 | 23.5 | 1.5 | 17.8 | 105 | 12 | Atm | 153 | 60 |
| 25 | do | 1 | 3 | 0.5 | 22.8 | 6.0 | 13.3 | 110 | 20 | Atm | 154 | 70 |
| 26 | do | 0.5 | 3 | 0.5 | 22.5 | 6.3 | 12.5 | 115 | 17 | Atm | 150 | 54 |
| 28 | do | 0.125 | 3 | 0.5 | 24.3 | 6.0 | 13.8 | 120 | 15 | Atm | 151 | 36 |
| 20 | do | 0.25 | 3 | 0.5 | 23.8 | 0.5 | 16.3 | 160 | 15 | Atm | 200 | 37 |
| 18 | do | 0.5 | 4.5 | 0.5 | 24.0 | 0.6 | 18.6 | 250 | | Atm | 202 | 58 |
| 30 | do | 0.5 | 3 | 0.5 | 24.0 | 6.0 | 13.3 | 130 | 55 | Atm | 151 | 27 |
| 29 | do | 0.5 | 1 | 0.5 | 23.3 | 6.0 | 14.0 | 125 | 30 | Atm | 149 | 51 |
| 32 | do | 0.5 | 2 | 0.5 | 23.8 | 6.0 | 13.5 | 114 | 12 | Atm | 152 | 65 |
| 31 | do | 0.5 | 6 | 0.5 | 23.8 | 6.0 | 13.3 | 102 | 12 | Atm | 151 | 84 |
| 21 | do | 0.5 | 7 | 0.5 | 23.3 | 6.0 | 12.5 | 238 | 110 | 100 N₂ | 153 | 45 |
| 22 | do | 0.5 | 3 | 0.5 | 22.0 | 6.0 | 13.3 | 360 | 200 | 200 N₂ | 152 | 56 |
| 23 | do | 0.5 | 3 | 0.5 | 23.0 | 6.0 | 12.5 | 477 | 290 | 300 N₂ | 151 | 49 |
| 34 | {AlCl₃ / FeCl₃} | {0.5 / 0.05} | 3 | 0.5 | 22.5 | 6.0 | 12.5 | 140 | 15 | Atm | 152 | 45 |
| 35 | {AlCl₃ / FeCl₃} | {0.4 / 0.1} | 3 | 0.5 | 22.3 | 6.0 | 11.7 | 155 | 25 | Atm | 151 | 39 |
| 36 | FeCl₃ | 0.5 | 3 | 0.5 | 24.8 | 5.7 | 15.3 | 115 | 10 | Atm | 151 | 43 |

From the table it will be seen that good yields are obtainable at both 150° and 200° C. and that yields of ethyl benzene increase with the mole ratio of benzene to ethyl mercaptan. (See runs 30, 29, 26, 32 and 31.) Increase in reaction time also improves the yield. (Runs 24 and 25.) It is also apparent from the table that yields of ethyl benzene increase as the mole ratio of aluminum chloride to ethyl mercaptan increases. (Runs 25, 26 and 28.) The initial pressure or the maximum pressure in the reaction vessel do not appear to materially affect the yield of ethyl benzene. (See runs 26, 21, 22 and 23.)

The results obtained clearly show anhydrous ferric chloride or mixtures of anhydrous ferric chloride and anhydrous aluminum chloride to be excellent catalysts for the reaction.

The runs recorded in the table were all made in a steel bomb having a capacity of 840 cc., having a glass liner. In making the runs, benzene, catalyst and alkyl mercaptan were weighed into the liner and immediately put into the bomb and the bomb top tightened. The bomb was then heated to the desired temperature and the temperatures, times and pressures recorded. After the desired period of heating, heat was turned off and the bomb allowed to cool until it had reached a temperature of about 25° C. The bomb was then dismantled and the contents of the liner were again weighed. The contents of the liner were then poured into a separatory funnel and agitated with cold water acidified with acid in order to decompose the catalyst complex. The resulting liquid was then washed with caustic soda solution followed by water and then filtered. The resulting sample was then analyzed for ethyl benzene.

Anhydrous hydrogen chloride may be used in conjunction with the aluminum chloride and/or ferric chloride. The presence of small amounts of hydrogen chloride in the reaction mixture tends to increase the yield of alkyl benzene. Hydrogen chloride may be used in amounts ranging from 0.01 mole to 1.0 mole per mole of metal halide.

It will be understood that mono- or polyalkylated benzenes, other than ethyl benzene, as for example methyl and propyl benzenes, may be prepared in the same manner as the ethyl benzene by substituting the corresponding mercaptan for ethyl mercaptan. ratios of the alkyl mercaptan to benzene in the mixture. Therefore, when it is desired to prepare mono-alkyl benzenes molal ratios of benzene to mercaptan of 2 to 1 or higher should be used.

It will be seen, therefore, that we have discovered a new method for preparing alkylated aromatic hydrocarbons.

We claim:

1. The method of synthesizing alkyl benzenes which comprises reacting benzene with a compound selected from the group consisting of aliphatic mercaptans and alkyl sulfides at a temperature of approximately 100°–400° C. in the presence of a Friedel-Crafts catalyst for a period of time sufficient to permit formation of a substantial quantity of alkyl benzenes.

2. The method of synthesizing alkyl benzenes which comprises reacting benzene with an aliphatic mercaptan at temperatures of approximately 100–200° C. in the presence of a Friedel-Crafts catalyst for a period of time sufficient to permit formation of a substantial quantity of alkyl benzenes.

3. The method of synthesizing alkyl benzenes which comprises reacting benzene with an aliphatic mercaptan at temperatures of approximately 100–200° C. in the presence of not less than about 0.1 mole of Friedel-Crafts catalyst per mole of mercaptan for a period of time sufficient to permit formation of a substantial quantity of alkyl benzenes.

4. The method of synthesizing ethyl benzene which comprises contacting a mixture of benzene and ethyl mercaptan at temperatures of approximately 150–200° C. with a Friedel-Crafts catalyst for a period of time sufficient to permit formation of a substantial quantity of alkyl benzenes.

5. The method of synthesizing ethyl benzene which comprises contacting a mixture of benzene and ethyl mercaptan with not less than 0.1 mole of Friedel-Crafts catalyst per mole of ethyl mercaptan at a temperature of approximately 150–200° C. for a period of time sufficient to permit formation of a substantial quantity of alkyl benzenes.

6. Method according to claim 2 in which the molal ratio of benzene to mercaptan in the reaction mixture is greater than 1:1.

7. Method according to claim 1 in which the Friedel-Crafts catalyst is anhydrous aluminum chloride.

8. Method in accordance with claim 1 in which the Friedel-Crafts catalyst is anhydrous ferric chloride.

9. The method of synthesizing alkylated aromatic hydrocarbons which comprises contacting a mixture of benzene and an aliphatic mercaptan in which the molal ratio of benzene to mercaptan is greater than 1:1 with a catalyst selected from the group consisting of anhydrous aluminum chloride and anhydrous ferric chloride at a temperature of approximately 100–200° C. for a period of time sufficient to permit formation of a substantial quantity of alkyl benzenes.

10. Method in accordance with claim 9 in which the molal ratio of benzene to mercaptan is within the limits of 2:1 to 14:1.

11. Method in accordance with claim 9 in which the catalyst is present in an amount not less than about 0.1 mole per mole of mercaptan.

12. Method in accordance with claim 4 in which the catalyst is anhydrous aluminum chloride.

13. Method in accordance with claim 4 in which the catalyst is anhydrous ferric chloride.

14. The method of synthesizing ethyl benzene which comprises contacting a mixture of benzene and ethyl mercaptan in a molal ratio within the limits of 2:1 to 14:1 with not less than 0.1 mole per mole of mercaptan of a catalyst selected from the group consisting of anhydrous aluminum chloride and anhydrous ferric chloride at a temperature of approximately 150–200° C. and maintaining the reaction mixture at reaction temperature for a period not less than approximately 30 minutes.

15. The method of synthesizing mono-alkylated benzenes comprising contacting benzene and an alkyl mercaptan for a period of time not less than about thirty minutes in a ratio of 2 to 14 moles of benzene to 1 mole of mercaptan at a temperature of 100–200° C. in the presence of a catalyst selected from the group consisting of anhydrous aluminum chloride and anhydrous ferric chloride in an amount not less than about 0.1 mole per mole of mercaptan.

16. Method in accordance with claim 15 in which the reaction period is approximately one-half to six hours and the catalyst is present in an amount of approximately 0.1 to 2 moles per mole of mercaptan.

CARLISLE M. THACKER.
RALPH C. SWANN.

REFERENCES CITED

The following references are of record in the file of this patent:

UNITED STATES PATENTS

| Number | Name | Date |
|---|---|---|
| 1,953,702 | Davidson | Apr. 3, 1934 |
| 2,141,611 | Malishev | Dec. 27, 1938 |
| 2,275,312 | Tinker et al. | Mar. 3, 1942 |
| 2,290,211 | Schaad | July 21, 1942 |
| 2,316,108 | Ruthruff | Apr. 6, 1943 |

OTHER REFERENCES

Tsukervanik et al., "Condensation of Alcohols—Aluminum Chloride III," Chem. Abst. 31: 5779 (1937). Jour. Org. Chem., vol. 4, page 48 (1 page only). (Patent Office Library (1939).)